US008925923B2

(12) United States Patent
Kanter

(10) Patent No.: US 8,925,923 B2
(45) Date of Patent: Jan. 6, 2015

(54) BOARD GAME TEACHING HEALTHY EATING HABITS

(71) Applicant: Kara Kanter, Roswell, GA (US)

(72) Inventor: Kara Kanter, Roswell, GA (US)

(*) Notice: Subject to any disclaimer, the term of this patent is extended or adjusted under 35 U.S.C. 154(b) by 0 days.

(21) Appl. No.: 14/018,639

(22) Filed: Sep. 5, 2013

(65) Prior Publication Data
US 2014/0011166 A1 Jan. 9, 2014

Related U.S. Application Data

(63) Continuation of application No. 13/015,867, filed on Jan. 28, 2011, now abandoned.

(60) Provisional application No. 61/299,613, filed on Jan. 29, 2010.

(51) Int. Cl.
A63F 3/00 (2006.01)

(52) U.S. Cl.
USPC .......................................... 273/242; 273/259

(58) Field of Classification Search
USPC ......... 273/242, 243, 244, 248, 249, 259, 298, 273/302, 308
See application file for complete search history.

(56) References Cited

U.S. PATENT DOCUMENTS

| 1,419,871 | A | | 6/1922 | McDonald | |
|---|---|---|---|---|---|
| 3,722,885 | A | * | 3/1973 | Leaf | 273/440 |
| 4,040,628 | A | * | 8/1977 | Pope | 273/243 |
| 4,159,117 | A | * | 6/1979 | Kuna | 273/243 |
| 4,174,840 | A | * | 11/1979 | Curtiss | 273/248 |
| 4,398,721 | A | * | 8/1983 | McKay | 273/249 |
| 4,440,396 | A | * | 4/1984 | Frudakis | 273/242 |
| 4,484,748 | A | * | 11/1984 | Becze | 273/256 |
| 4,718,675 | A | * | 1/1988 | Rosenberg et al. | 273/243 |
| 4,900,032 | A | * | 2/1990 | Erickson et al. | 273/243 |
| 4,986,757 | A | * | 1/1991 | Mueller | 434/127 |
| 5,062,645 | A | * | 11/1991 | Goodman et al. | 273/249 |
| 5,544,891 | A | * | 8/1996 | Gibson et al. | 273/244 |
| 5,704,611 | A | * | 1/1998 | Pierce | 273/243 |
| 2009/0305772 | A1 | | 12/2009 | Melendez | |

* cited by examiner

Primary Examiner — Vishu K. Mendiratta
(74) Attorney, Agent, or Firm — Baker & Hostetler LLP

(57) ABSTRACT

A game to help players learn how to make the best choices in regards to nutrition and exercise is disclosed. A game board may be configured with start areas, food choice areas, and exercise areas. Players on food choice areas must answer a food choice question and add tokens to the player's weight container based on the answer. Players on an exercise question must answer an exercise question and add or remove tokens to or from player's weight container based on the answer. Answers to an exercise question can require that a player perform an exercise listed on a selected exercise card and remove tokens from the player's weight container based on successfully performing the exercise in whole or in part. When all the players have made a complete circuit of the game board, each player weighs his or her weight container and determines in which weight category his or her weight container falls.

18 Claims, 14 Drawing Sheets

BOARD GAME TEACHING HEALTHY EATING HABITS

CROSS-REFERENCE TO RELATED APPLICATION

This application is a continuation of, and hereby claims priority to, and the full benefit of, U.S. non-provisional application Ser. No. 13/015,867, filed on Jan. 28, 2011, entitled "Board Game Teaching Healthy Eating Habits," which claimed priority to, and the full benefit of, U.S. provisional application Ser. No. 61/299,613, filed on Jan. 29, 2010, also entitled "Board Game Teaching Healthy Eating Habits," the disclosures and contents of which are hereby incorporated by reference in their entirety.

TECHNICAL FIELD

The technical field of the present disclosure generally relates to board games and more specifically relates to board games that help teach healthy eating habits.

BACKGROUND

Overeating and obesity are common problems in modern society. Many people have difficulty maintaining a healthy weight, while many more are unable to successfully lose weight and keep excess weight from returning. There are also many people who are not overweight, but who have unhealthy eating habits and fail to exercise enough. In the prior art, there are many examples of games and systems that are intended to educate and assist people in maintaining a healthy lifestyle, along with healthy eating and exercise habits. These games and systems typically involve moving playing pieces around a game board and answering questions or performing activities relating to weight loss or healthy eating. In such games, the "weight" gained or lost during a game is abstracted from any actually physical activity of the players. There is no tangible representation of weight gained or lost during the course of the game, nor is any measurement of such gained or lost weight performed. Moreover, prior art games do not clearly demonstrate the connection between weight gain from food eaten and weight lost from exercising. The prior art games and systems do not allow users to actually experience weight gain and weight loss through representative playing pieces and then assign a value or label to weight gained and lost by measuring actual physical characteristics, such as weight, of the playing pieces.

SUMMARY

A game to help players learn how to make the best choices in regards to nutrition and exercise is disclosed. In one embodiment, a game board may be configured with start areas, food choice areas, and exercise areas. When a player's playing piece lands on a food choice area, the player must answer a food choice question and then place one or more tokens associated with the player's answer to the food choice question into the player's weight container. When a player's playing piece lands on an exercise question, the player must answer an exercise question and then may add or remove one or more tokens associated with the player's answer to the exercise question to or from the player's weight container. The player's answer to an exercise question may also be associated with an exercise card. In such embodiments, the player must select an exercise card and perform the exercise listed on the card, in some embodiments within a given time period. If the player successfully completes the listed exercise, the player then may remove one or more tokens from the player's weight container as indicated on the exercise card. Once the players have made a complete circuit of the game board, each player may weigh his or her weight container and determine in which weight category his or her weight container falls.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Game Board and Accessories

Figure 1:
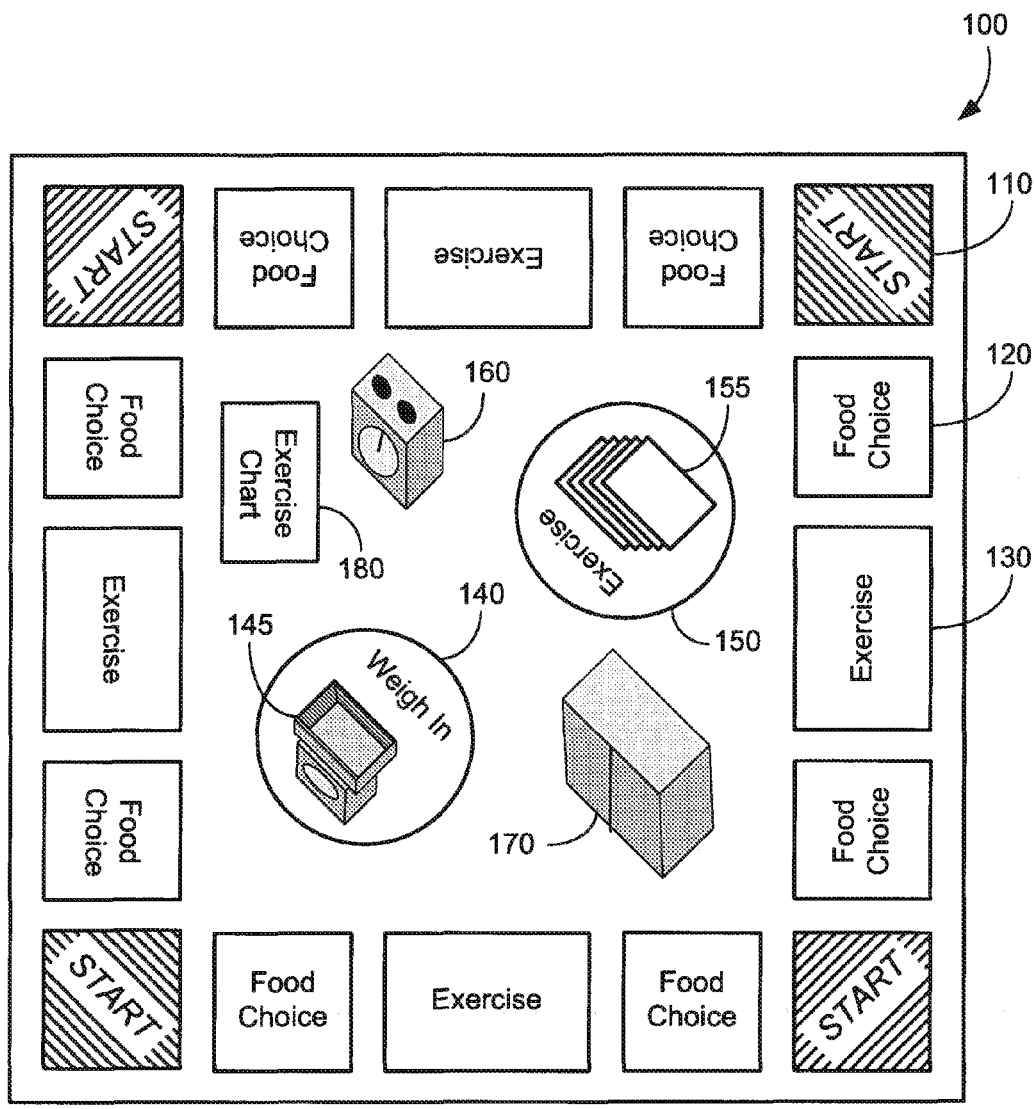
FIG. 1 illustrates an exemplary, non-limiting game board that may be used in some embodiments of the present disclosure.

FIG. 1 illustrates exemplary, non-limiting game board 100 that may be used in one embodiment. Game board 100 may be square, rectangular, circular, or in any other shape, and may be of any size. Game board 100 may include several areas for use in game play indicated by markings, coloring, patterns, or any other visible indicator.

In one embodiment, game board 100 may include one or more start areas 110. These areas may be used as a starting point and/or ending point for playing pieces during game play, as described in more detail below. There may be as many start areas 110 as desired, and each start area may be assigned to an individual playing piece or player, or may be shared by several players. In one embodiment, where game board 100 is square or rectangular in shape, game board 100 may be configured with four start areas 110, one in each corner of game board 100 as shown in FIG. 1. In some embodiments, where the present disclosure is implemented entirely or in part on a computer or computing device, game board 100 may be presented on a computing device or peripheral device, such as a computer monitor or other visual display. Any other number or configuration of start areas 110 are contemplated as within the scope of the present disclosure.

Game board 100 may also include one or more food choice areas 120. These may be areas where a player is required to answer a question about food choices or make a food choice, as described in more detail below. The questions or choices presented may be integrated into food choice areas 120, or may be presented on a card, paper, or other presentation means that a player landing on food choice areas 120 may be required to read. Alternatively, in some embodiments where the present disclosure is implemented entirely or in part on a computer or computing device, food choice questions or choices may be presented on a computing device or peripheral device. For example, questions or choices may be presented on a computer monitor or display, or audibly presented through audio speakers. Players may be required to add tokens to their respective playing pieces indicating weight gained when answering food questions or making food choices. The number and type of tokens added to a player's playing piece may vary depending on the player's answers and/or choices. There may be as many food choice areas 120 as desired, and each food choice area may be shared by several players during game play, or may be assigned or associated with only one or a subset of game players or playing pieces. In one embodiment, where game board 100 is square or rectangular in shape, game board 100 may be configured with eight food choice areas 120, one on either side of a start area 110 as shown in FIG. 1. Any other number or configuration of food choice areas 120 are contemplated as within the scope of the present disclosure.

Game board 100 may also include one or more exercise areas 130. These may be areas where a player is required to answer a question about exercise or make an exercise decision as described in more detail below. A player whose playing piece is on an exercise area 130 may also be required to perform an exercise. The questions or choices presented may be integrated into exercise areas 130, or may be presented on a card, paper, or other presentation means that a player landing on exercise areas 130 may be required to read. Alternatively, in some embodiments where the present disclosure is implemented entirely or in part on a computer or computing device, exercise questions or choices may be presented on a computing device or peripheral device. For example, questions or choices may be presented on a computer monitor or display, or audibly presented through audio speakers. Players may be allowed to remove tokens from their respective playing pieces indicating weight lost when answering exercise questions, making exercise choices, and/or performing exercises. The number and type of tokens removed from a player's playing piece may vary depending on the player's answers, choices, and/or exercises. There may be as many exercise areas 130 as desired, and each exercise area may be shared by several players during game play, or may be assigned or associated with only one or a subset of game players or playing pieces. In one embodiment, where game board 100 is square or rectangular in shape, game board 100 may be configured with four exercise areas 130, one between each of food choice areas 120, as shown in FIG. 1. Any other number or configuration of exercise areas 130 are contemplated as within the scope of the present disclosure.

Game board 100 may also include areas that are used to locate devices, cards, and any other apparatus or means that may be used during game play. For example, weigh-in area 140 may be configured on game board 100. Scale 145 may be located at weigh-in area 140 and may be used periodically during game play, as described in more detail below. Exercise card area 150 may also be configured on game board 100, and may be used to contain or otherwise indicate an area for placing exercise cards 155. Any other areas may be configured on game board 100 and may be used for any purpose. All such areas are contemplated as within the scope of the present disclosure. Note that game board 100 may be configured to reflect particular cultures, cuisines, and/or languages, and may, therefore, allow the present game to appeal to players of diverse backgrounds and cultures.

Game board 100 may also be configured with various additional apparatuses, such as timer 160 and playing piece cabinet 170. Timer 160 may be used to time game play or for other purposes, and may any type of timer, stopwatch, or other timing device. Timer 160 may be integrated into game board 100, or may be a separate device. Cabinet 170 may be used to contain some or all of the playing pieces and tokens until they are needed during game play, and may also be used to store playing pieces and tokens when the game is not in use. Cabinet 170 may be any shape or size, and, in one embodiment, may resemble a pantry or cabinet in which food is typically stored. Exercise chart 180 may be included with the presently disclosed game and may be used to determine the appropriate action to take in response to an exercise question, as described in more detail below. Exercise chart 180 may be a separate card, paper, or display, or may be integrated into game board 100 and/or a computer version or simulation thereof. Any other apparatuses or objects may be used with the disclosed game, and all such apparatuses and objects are contemplated as within the scope of the present disclosure.

Figure 2:
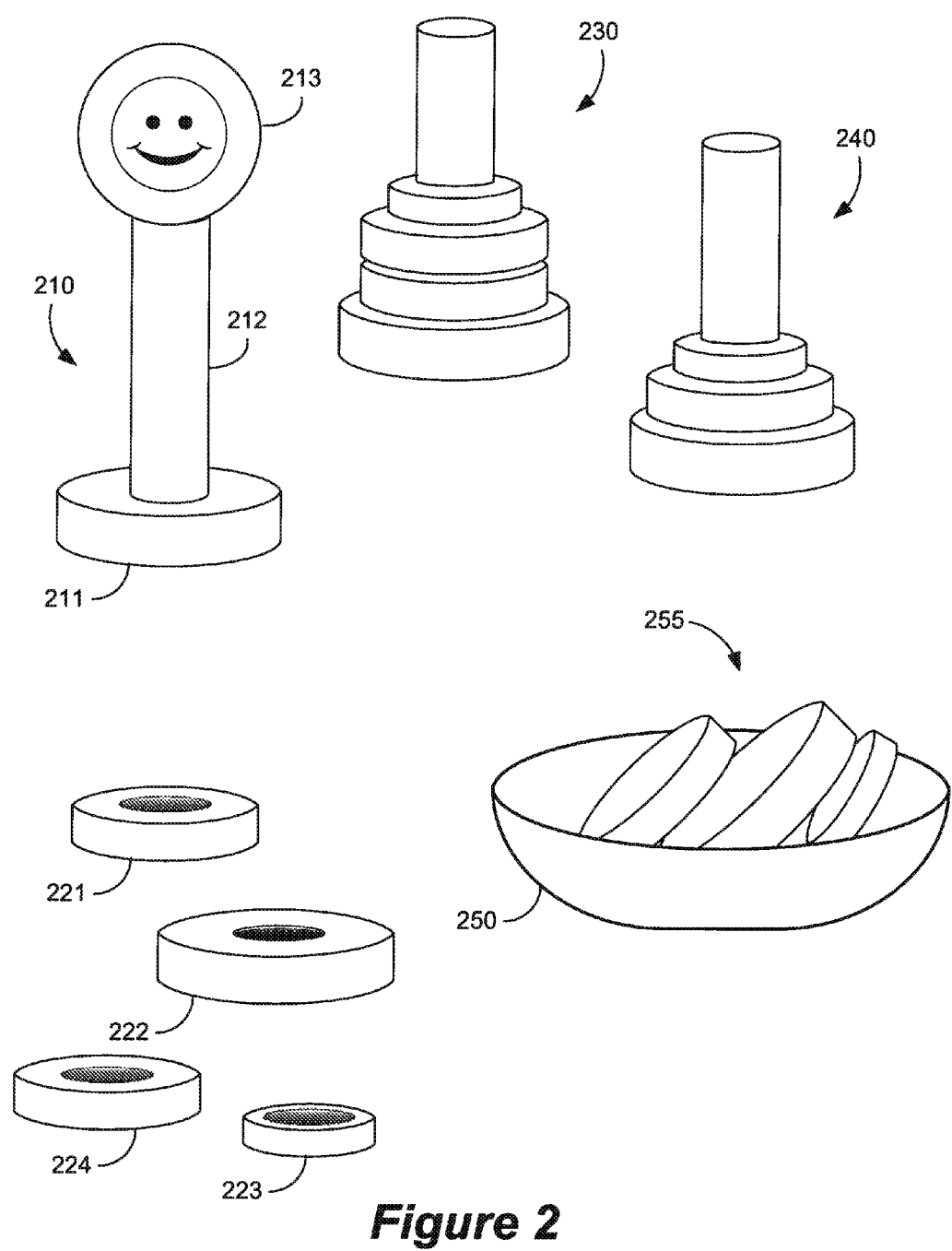
FIG. 2 illustrates exemplary, non-limiting playing pieces that may be used in some embodiments of the present disclosure.

FIG. 2 illustrates several exemplary, non-limiting playing pieces, tokens, and a weight container that may be used in some embodiments of the present disclosure. In one embodiment, playing piece 210 may be configured with base 211 and column 212. Note that playing piece 210 may serve as solely a playing piece, a playing piece and a weight container, or an adjustable weight token. Playing piece 210 may be constructed such that it is stable when resting on its base and easy to move around a game board. In some embodiments, playing piece 210 may be customized or customizable based on a user's preference. For example, playing piece 210 may be configured with element 213 allowing a player to insert a picture, drawing, or other visual indicator in order to customize playing piece 210. Alternatively, playing piece 210 may be configured with several attachable elements allowing a player to alter the physical characteristics of paying piece 210. Any other means or methods of customizing a playing piece are contemplated as within the scope of the present disclosure.

In some embodiments, playing pieces may also serve as weight containers. For example, tokens representing weight, such as tokens 221-224, may be configured to fit onto playing piece 210 using any effective means or construction. For example, tokens 221-224 may be configured with a hole that allows such tokens to affix to playing piece 210 by inserting column 212 through the hole. Such tokens may then rest upon base 211. As illustrated in FIG. 2, playing pieces may be configured to hold or have attached several tokens. For example, playing piece 230 may be configured with three tokens of various sizes, while playing piece 240 may be configured with two tokens of two different sizes. In such embodiments, playing pieces and tokens may be configured to attach or affix to one another using any effective means. In other embodiments, playing pieces, such as playing pieces 210, 220, and 230, may be constructed of a flexible material that allows the insertion of tokens into these playing pieces. The playing pieces may then expand and contract as tokens are inserted or removed and simulate a person gaining and losing weight.

In some embodiments, playing pieces may be used only to indicate a player's position on a game board, while weight in the form of tokens may be added to or removed from weight container 250. Weight container 250 may be of any size or shape that allows it to hold or contain tokens 255. In this embodiment, each of tokens 255 may be of any shape and size such that several of tokens 255 can simultaneously be placed in weight container 250. In other embodiments, weight container 250 may be constructed of a flexible material that allows weight container 250 to expand and contract. In such an embodiment, tokens may be inserted into weight container 250, which may then expand to accommodate such tokens. Likewise, weight container 250 may contract when tokens are removed. Any configuration of weight containers and tokens may be used. Note that, like playing piece 210, weight container 250 may be customizable according to a user's preferences using any means or methods.

Tokens may be various sizes and/or weights that reflect the foods associated with such tokens. For example, token 222 may be a larger size and/or weight token (e.g., five grams), and may represent a food of large caloric value, such as a piece of cake or a bowl of ice cream. Token 223 may be a smaller size and/or weight token (e.g., one gram), and may represent a food of lesser caloric value, such as a salad or a serving of vegetables. Tokens 221 and 224 may be middle sized tokens relative to larger and smaller tokens (e.g., three grams), and may represent food of a relatively medium caloric value, such as a piece of chicken or serving of pasta. Alternatively, tokens of the same size may be of different weights due to their construction. For example, tokens 221 and 224 may be have the same physical dimensions, but may be constructed of different materials and/or different amounts of material such that token 221 weighs less than token 224 (e.g., two grams). Any other means or manner of constructing tokens is contemplated as within the scope of the present disclosure.

In another embodiment, tokens may be configurable as to weight. For example, playing piece 230 may be a configurable token, and may be associated with a food choice that requires three weights configured on a playing piece such as playing piece 210. Likewise, playing piece 240 may be a configurable token, and may be associated with a food choice that requires only two weights configured on a playing piece such as playing piece 210. In such an embodiment, a configurable token 240 with two weights may be associated with a food choice that is lower in calories or higher in nutritional content than configurable token 230 configured with three weights.

In one embodiment, each of tokens 221-224 and/or configurable tokens 230 and 240 may be constructed to physically resemble the food choices each token represents. For example, token 223 may represent a piece of watermelon, and therefore may be shaped and colored or otherwise constructed to resemble a miniature piece of watermelon. Alternatively, sections of configurable tokens, such as the base of configurable token 240, may physically resemble the food choices with which they are associated. For example, a base of configurable token 240 may be shaped and/or colored like a piece of watermelon, a cupcake, or the like. In such an embodiment, tokens representing or configured to resemble high caloric foods may weigh more than tokens representing or configured to resemble low caloric foods. Note that tokens and playing pieces may be configured to reflect particular cultures and/or cuisines, and may, therefore, allow the present game to appeal to players of diverse backgrounds and cultures.

Figure 3:
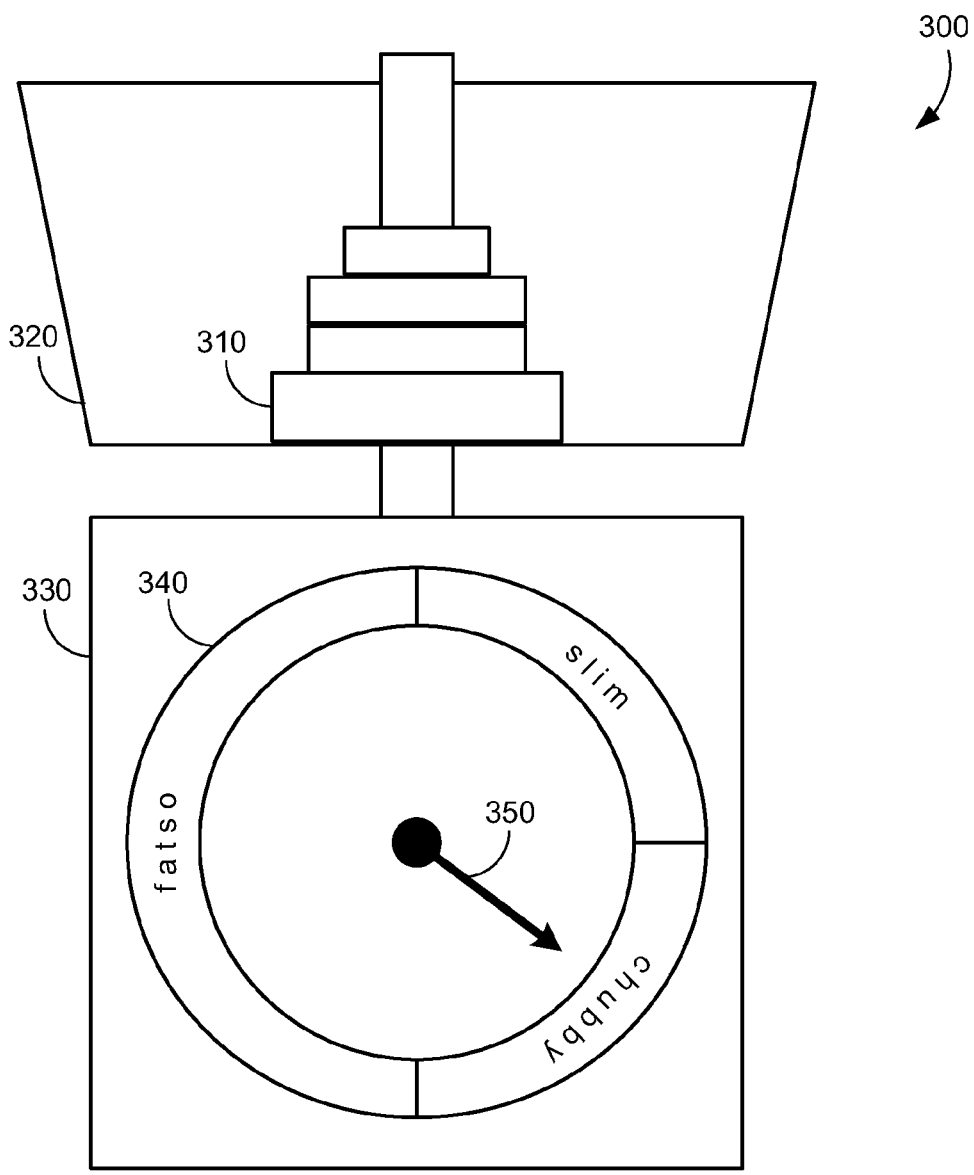
FIG. 3 illustrates an exemplary, non-limiting scale that may be used in some embodiments of the present disclosure.

FIG. 3 illustrates exemplary, non-limiting scale 300 that may be used in some embodiments. Scale 300 may be configured with a base 330 upon which a platform 320 may be affixed. Objects to be weighed, such as weight container 310, may be placed in or on platform 320 in order to activate the weighing mechanism housed in base 330 that, in turn, actuates needle 350. Base 330 may include dial 340 that may be configured with markings and/or other indicators used during game play. For example, dial 340 may be configured with markings such as "slim", "chubby", and "fatso" that correspond to increasingly heavier weight measurements. Thus, when a player places weight container 310 on platform 320, needle 350 may point to the corresponding weight value, indicating, for example, that weight container 310 consists of tokens the total weight of which are in the category of "chubby".

Note that any type of scale may be used in various embodiments, as well as any indicated weight categories. For example, an electronic scale may be used, and in some embodiments, may be configured to display the weight category corresponding to a weighed item on a digital or video display. Alternatively, a scale connected to a computing device may be used, with the resulting weight category displayed on a monitor or visual display of the computing device. In some embodiments, the actual weight of a weight container may also be presented to players, along with a corresponding weight category.

Figure 4:
FIG. 4 depicts an exemplary, non-limiting game board.
Figure 5:
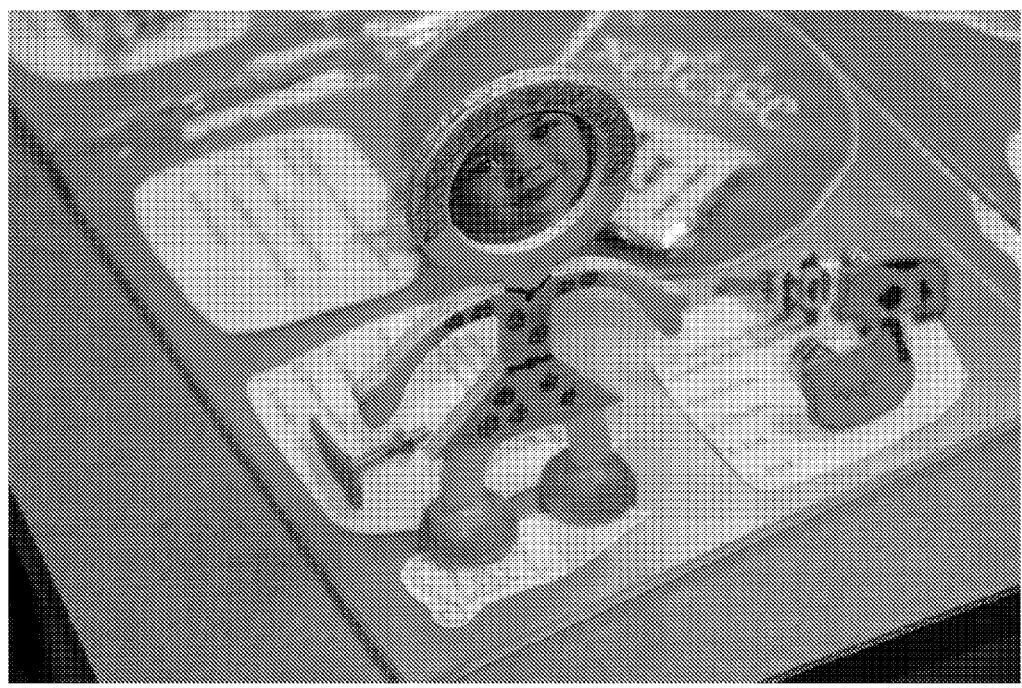
FIG. 5 depicts an exemplary, non-limiting playing piece.
Figure 6:
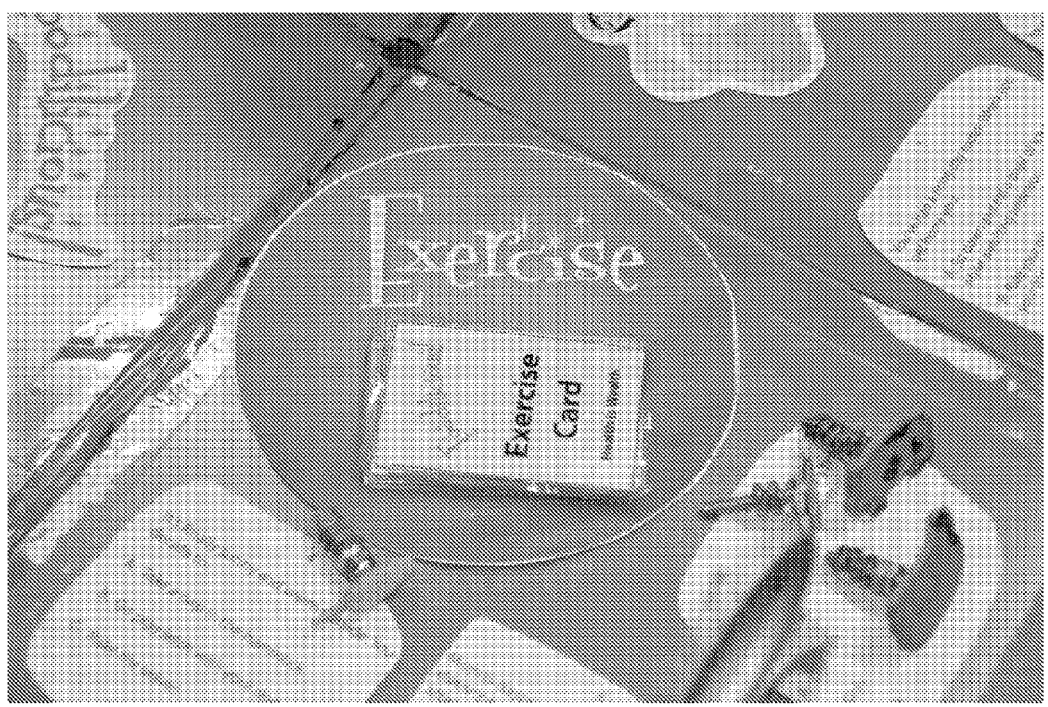
FIG. 6 depicts exemplary, non-limiting exercise cards configured on an exemplary, non-limiting exercise card area.
Figure 7:
FIG. 7 depicts an exemplary, non-limiting scale configured on a weigh-in area.
Figure 8:
FIG. 8 depicts exemplary, non-limiting tokens.
Figure 9:
FIG. 9 depicts exemplary, non-limiting tokens in a food choice area.
Figure 10:
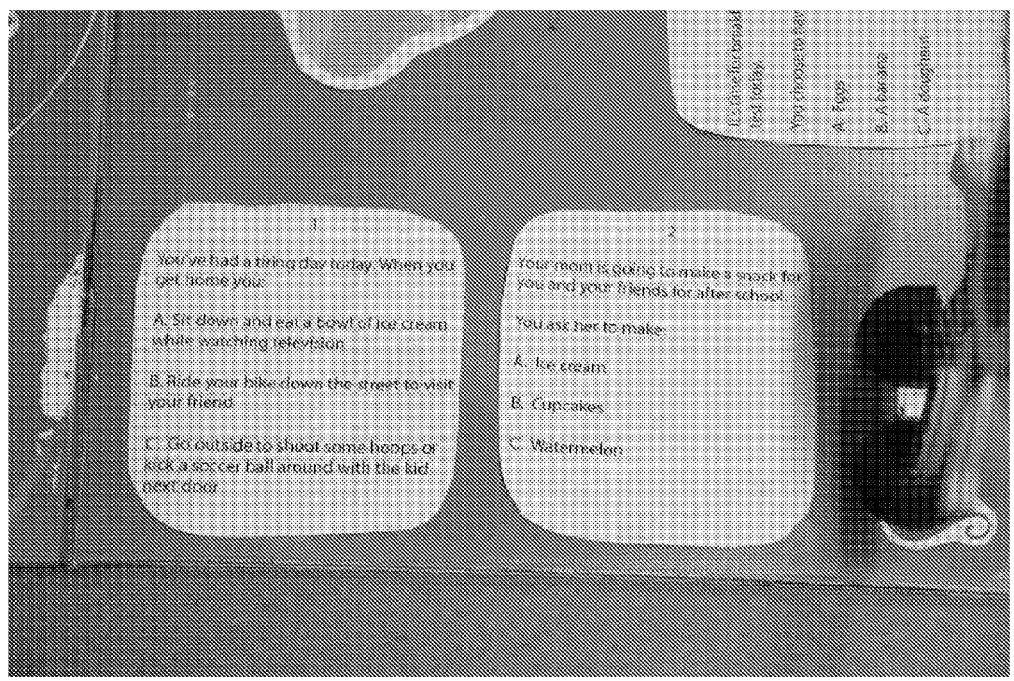
FIG. 10 depicts an exemplary, non-limiting exercise area and food choice area.
Figure 11:
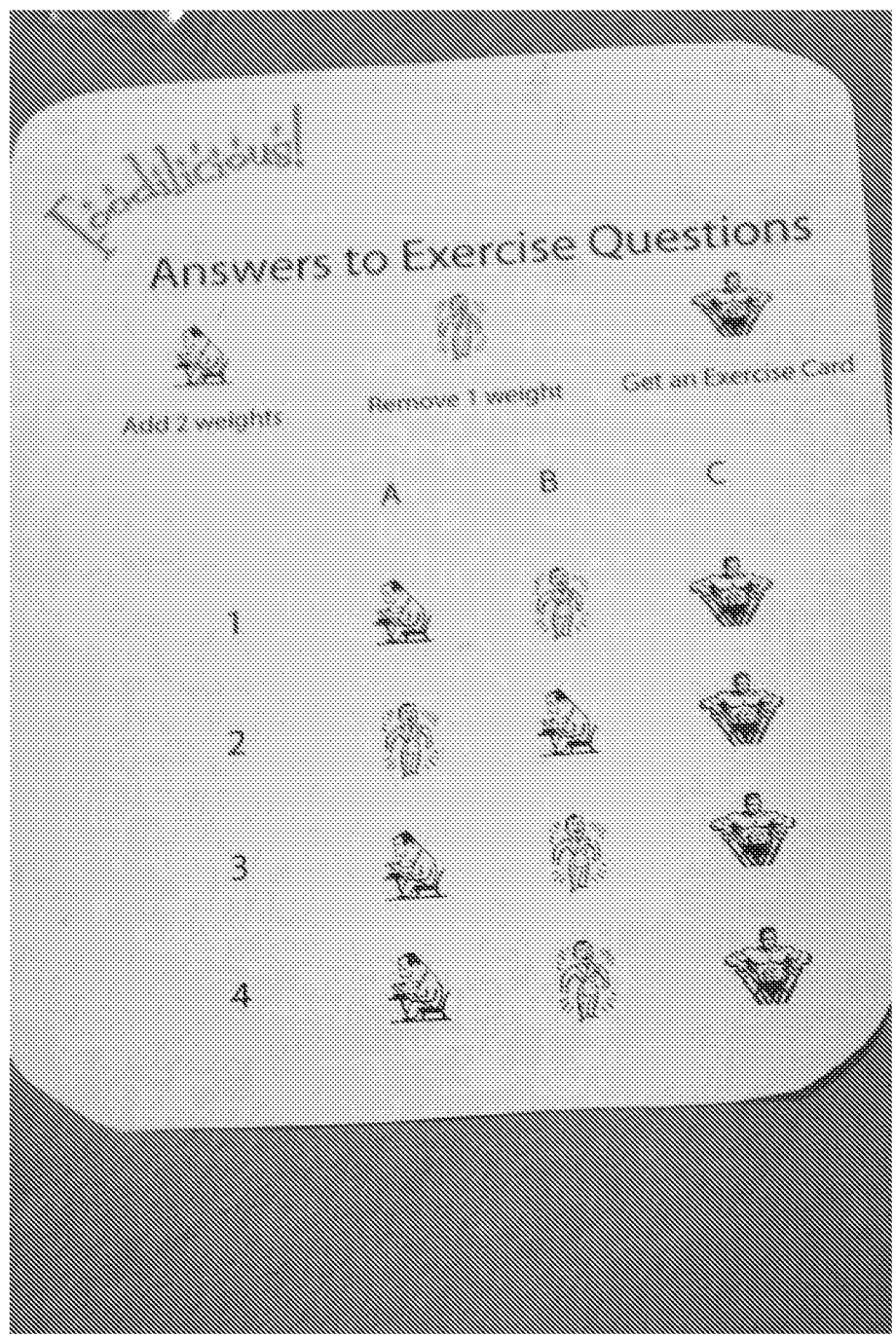
FIG. 11 depicts an exemplary, non-limiting exercise chart.
Figure 12:
FIG. 12 depicts exemplary, non-limiting exercise cards configured on an exercise card area.
Figure 13:
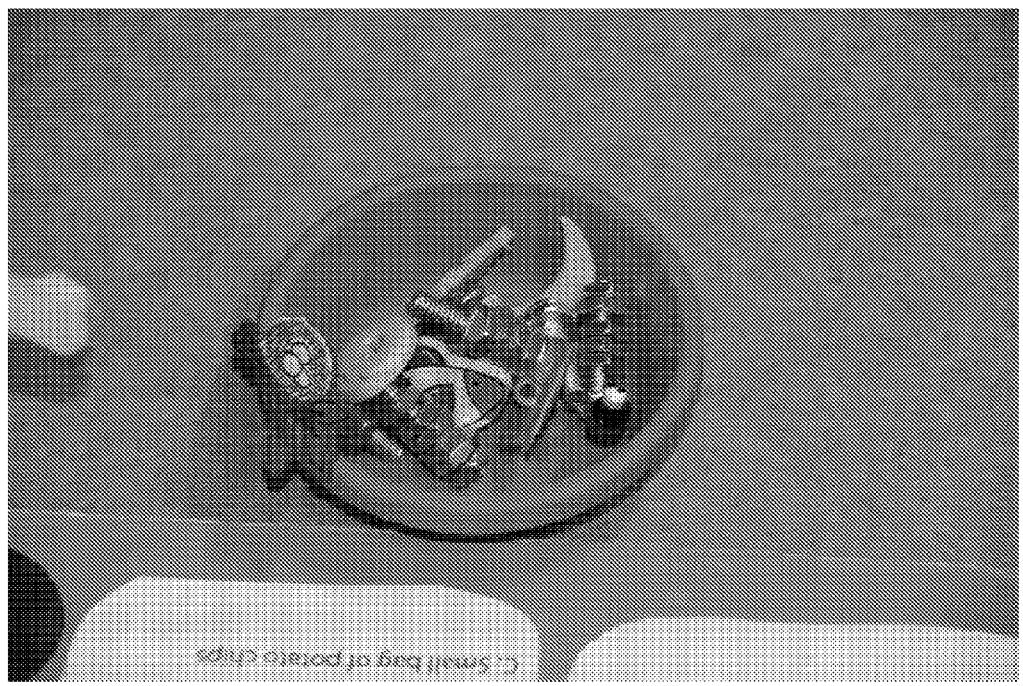
FIG. 13 depicts exemplary, non-limiting tokens.
Figure 14:
FIG. 14 depicts exemplary, non-limiting tokens within a weight container that have been placed on a scale.

For purposes of providing further details of construction regarding some of the alternative embodiments discussed hereinabove, FIG. 4 depicts an exemplary, non-limiting game board. FIG. 5 depicts an exemplary, non-limiting playing piece. FIG. 6 depicts exemplary, non-limiting exercise cards configured on an exemplary, non-limiting exercise card area. FIG. 7 depicts an exemplary, non-limiting scale configured on a weigh-in area. FIG. 8 depicts exemplary, non-limiting tokens. FIG. 9 depicts exemplary, non-limiting tokens in a food choice area. FIG. 10 depicts an exemplary, non-limiting exercise area and food choice area. FIG. 11 depicts an exemplary, non-limiting exercise chart. FIG. 12 depicts exemplary, non-limiting exercise cards configured on an exercise card area. FIG. 13 depicts exemplary, non-limiting tokens. FIG. 14 depicts exemplary, non-limiting tokens within a weight container that have been placed on a scale.

Rules of Play

Set forth herein are rules of play for one embodiment, as well as variations that may be used without departing from the scope of the present disclosure. Other variations on play that are not explicitly recited are also contemplated as within the scope of the present disclosure.

Before game play begins, each player obtains a playing piece and a weight container. The playing piece and weight container may be combined into a single playing piece, as described above. Each player may place their respective playing piece in a start area of a game board. In some embodiments, each player is assigned or selects his or her own start area, while in other embodiments, players may share start areas or all players may use the same start area. In other embodiments, specific start areas may be associated with specific playing pieces, and players using such playing pieces may place their playing pieces on the associated start areas.

The first player to play may be selected using any means, such as rolling of one or more dice, or the like. The first player may then move their playing piece counter-clockwise (or alternatively clockwise) to the first box or area closest to that player's start area. The first player performs the activity associated with that box or area, and then moves to the next box or area. In one embodiment, each player continues to move to the next box or area until that player lands on another player's start area. At that point, it is the next player's turn. Alternatively, players may take turns moving one box or area per turn. Game play may proceed in this fashion until all the players return to their respective start areas. At that point, the players weigh their weight containers or playing pieces to determine their respective weight category.

Each box or area on the game board that is not a start area may be associated with either a food choice activity or an exercise activity. In some embodiments, food choice areas and exercise areas may alternate as shown in FIG. 1. In one embodiment, if a player lands on a food choice area, the player must answer the question presented in that area. For example, a multiple choice question may be printed in the food choice area, such as:

Your mom is going to make a snack for you and your friends after school. You ask her to make:
A. Ice cream
B. Cupcakes
C. Watermelon Alternatively, landing on a food choice area may require that a player pick a food choice card from among several food choice cards that have food choice questions printed on them. In another alternative, in a wholly or partially computer implemented version of the present disclosure, a player whose playing piece is on an actual or virtual food choice area may be presented with a food choice question displayed on a computer monitor or other visual display. Any means or methods of presenting food choice questions may be used. Note also that the questions presented need not be multiple choice, but can instead be other forms of questions. Moreover, food questions may be in any language and composed in a way that reflects particular cultures and/or cuisines and may therefore allow the present game to appeal to players of diverse backgrounds and cultures.

In one embodiment, the player then selects a token that represents the food choice made in response to the food choice questions presented. Such tokens may be stored in a simulated pantry or other imitation food container. In the example above, if the player selects ice cream, then the player must obtain an ice cream token and place it in the player's weight container (which may, in an embodiment, be the player's playing piece). If the player selects cupcakes, the player must obtain a cupcake token and place it in the player's weight container, and so forth. Each of the tokens may be identified with the associated food choice as described above, such as having the shape and color of the associated food choice, or the like. Alternatively, tokens may be identified by writing on the tokens that indicates the food choice. As described above, each token may have a weight that corresponds to the caloric or nutritional value of the associated food choice. For example, a watermelon token may weigh less than an ice cream token, or the like.

In one embodiment, if a player lands on an exercise area, the player must answer the question presented in that area. For example, a multiple choice question may be printed in the exercise area, such as:

You have had a tiring day. When you get home you:
A. Sit down and eat a bowl of ice cream while watching TV
B. Ride your bike down the street to visit your friend
C. Go outside and shoot some hoops or kick a soccer ball around with the kid next door Alternatively, landing on an exercise area may require that a player pick an exercise card from among several exercise cards that have exercise questions printed on them. In another alternative, in a wholly or partially computer implemented version of the present disclosure, a player whose playing piece is on an actual or virtual exercise area may be presented with an exercise question displayed on a computer monitor or other visual display. Any means or methods of presenting exercise questions may be used. Note also that the questions presented need not be multiple choice, but can instead be other forms of questions. Moreover, exercise questions may be in any language and composed in a way that reflects particular cultures and/or cuisines and may, therefore, allow the present game to appeal to players of diverse backgrounds and cultures.

Upon selecting an answer from an exercise card, in one embodiment, reference may be made to an exercise chart that may accompany the disclosed game. The exercise chart may list the potential answers to an exercise question and the associated activity. For example, an exercise chart may require that weight, in one embodiment in the form of a token, be removed from or added to a player's weight container, or that the player perform an exercise:

Answers to Exercise Questions

| Question 1: | A - add 2 tokens | B - remove 1 token | C - perform an exercise |
| Question 2: | A - add 1 token | B - remove 2 tokens | C - perform an exercise |
| Question 3: | A - add 2 tokens | B - remove 2 tokens | C - perform an exercise |

In one embodiment, if the player selects an answer to an exercise question that is associated on the exercise chart with an instruction to perform an exercise (answer 'C' in the above example), the player may then be required to select an exercise card. The exercise card may have instructions that include an exercise to be performed and an amount of weight or number of tokens to remove from the player's weight container:

Exercise Card

Do 25 jumping jacks in 1 minute
If successful, remove two tokens

Note that in some embodiments, players are required to actually perform the exercises set forth in the exercise cards. In such embodiments, the player performing an exercise may not be permitted to remove any tokens or weights from the player's weight container unless the listed exercise is successfully performed. In such embodiments, a player may have a set amount of time in which to perform the listed exercise. A timer as disclosed herein may be used to time players as they perform exercises in order to determine whether the player has performed the exercise within the allotted time and is, therefore, eligible to remove the associated tokens or weights from the player's weight container.

In other embodiments, players are permitted to actually perform only a portion of the exercises set forth in the exercise cards. In such embodiments, the player performing an exercise may be permitted to remove a proportional amount or number of tokens or weights from the player's weight container corresponding to the degree that the listed exercise is successfully performed. In such embodiments, a player may similarly have a set amount of time in which to perform the listed exercise. Thus, in such embodiments, if the player does not complete the required exercise, but, for example, successfully performs one-half of the required exercise in the time given, the player may be able to remove one-half the associated tokens or weights from the player's weight container. As in other embodiments described herein, a timer may be used to time players as they perform exercises in order to determine whether the player has performed the exercise within the allotted time and is, therefore, eligible to remove the proportional amount or number of associated tokens or weights from the player's weight container.

As noted above, in some embodiments a player answers the questions and performs the activities associated with the boxes or areas upon which the player's playing piece lands until the play reaches another player's start area. At that point, the next player takes his or her turn and does the same, moving his or her playing piece about the board answering questions and performing activities until reaching another player's start area. Play continues in this fashion, with each player answering questions, performing exercises, and adding and removing tokens or weights according to the rules of the game as set forth herein.

In one embodiment, once all the players have moved their pieces about the game board and returned to their respective start areas, each player weighs his or her weight container on a scale and determines a weight category or value as described herein. A scale such as that described in FIG. 3 may be used, and categories such as those shown on the scale of FIG. 3 may be used to categorize weight containers. Varying quantities and types of weight categories may be used, and such categories may be assigned any label. All such embodiments are contemplated as within the scope of the present disclosure.

In some embodiments, the player or players who fall into the lowest weight category are determined to be the winner(s). In other embodiments, when actual weights are determined from the scale rather than, or in addition to, weight categories, the player with the lowest weight may be the winner. In other embodiments, rather than assigning one or more winners or losers, the goal of the game may be simply to end the game in a low weight category, or to determine, based on realistic answers to the questions, a weight category that corresponds to the actual fitness or weight level of a player.

Note that while the present disclosure discusses primarily a version of the disclosed game the employs a physical game board and pieces, portions or the entirety of the present disclosure may be implemented using computing devices of any type. Such devices may include one or more laptop or desktop computers, portable or home video game consoles, portable devices such as handheld computers, personal digital assistants (PDAs), cellular telephones, or the like, without limitation. Portions of the present disclosure may also be implemented in software that is stored on a computer-readable medium. Any peripheral devices may be used to assist players in game play. All such embodiments are contemplated as within the present disclosure.

What is claimed is:

1. A board game comprising:
   a game board, the game board comprising:
      a path, the path comprising:
         a plurality of food choice areas,
         a plurality of exercise areas, and
         at least one start area;
   a plurality of playing pieces, each playing piece associated with a player;
   a plurality of weight containers, each weight container associated with a player;
   a plurality of tokens, each said token corresponding to a food represented by said token, each said token further comprising a weight, said weight corresponding to a relative caloric content of the food represented by said token, such that said weight is greater when corresponding to a greater relative caloric content of the food represented by said token, and such that said weight is lesser when corresponding to a lesser relative caloric content of the food represented by said token;
   a food choice question associated with each food choice area on the path, the food choice question requiring a player to judge amongst the relative caloric content of a plurality of suggested foods, and to optimize the answer in order to select a token representing a food of lowest caloric content;
   an exercise question associated with each exercise area on the path, the exercise question requiring a player to judge amongst the relative caloric expenditure of a plurality of suggested exercises, and to optimize the answer in order to select an exercise representing a greatest caloric expenditure; and,
   a scale.

2. The board game of claim 1, wherein each of the plurality of weight containers comprises a column section interconnected with a base section, and wherein each of the plurality of tokens is configured to affix to each of the plurality of weight containers about the column section of each of the plurality of weight containers.

3. The board game of claim 1, wherein the game board is rectangular shaped.

4. The board game of claim 1, wherein a display of the scale comprises sections corresponding to a plurality of weight categories.

5. The board game of claim 1, wherein each of the plurality of playing pieces comprises an element configured to receive a photograph or other customized image of a player.

6. The board game of claim 1, further comprising a plurality of food choice question cards associated with the plurality of food choice areas.

7. The board game of claim 6, wherein each of the plurality of food choice question cards comprises at least one multiple choice question.

8. The board game of claim 1, further comprising a plurality of exercise question cards associated with the plurality of exercise areas.

9. The board game of claim 8, wherein each of the plurality of exercise question cards comprises at least one multiple choice question.

10. A board game comprising:
   a game board, the game board comprising:
      a path, the path comprising:
         a plurality of food choice areas,
         a plurality of exercise areas, and
         at least one start area;
   a plurality of playing pieces, each playing piece associated with a player;
   a plurality of weight tokens, each weight token embodying at least one of a weight, a number, and a type corresponding to a relative caloric content of a food represented by said weight token;
   a plurality of weight containers, each said weight container associated with a player, each said weight container comprising a column section interconnected with a base section, each said weight container configured to carry at least one of said plurality of weight tokens about said column section;
   a food choice question associated with each food choice area on the path, the food choice question requiring a player to judge amongst the relative caloric content of a plurality of suggested foods, and to optimize the answer in order to select a weight token representing a food of lowest caloric content;

an exercise question associated with each exercise area on the path, the exercise question requiring a player to judge amongst the relative caloric expenditure of a plurality of suggested exercises, and to optimize the answer in order to select an exercise representing a greatest caloric expenditure; and, a scale.

11. The board game of claim 10, wherein the game board is rectangular shaped.

12. The board game of claim 10, wherein a display of the scale comprises sections corresponding to a plurality of weight categories.

13. The board game of claim 10, wherein each of the plurality of playing pieces comprises an element configured to receive a visual indicator, photograph, or other customized image of a player.

14. The board game of claim 10, wherein each of the plurality of weight tokens comprises a weight that corresponds to a food item associated with the weight token.

15. The board game of claim 10, further comprising a plurality of food choice question cards associated with the plurality of food choice areas.

16. The board game of claim 15, wherein each of the plurality of food choice question cards comprises at least one multiple choice question.

17. The board game of claim 10, further comprising a plurality of exercise question cards associated with the plurality of exercise areas.

18. The board game of claim 17, wherein each of the plurality of exercise question cards comprises at least one multiple choice question.

* * * * *